(12) United States Patent
Iqbal et al.

(10) Patent No.: US 9,337,999 B2
(45) Date of Patent: May 10, 2016

(54) APPLICATION USAGE CONTINUUM ACROSS PLATFORMS

(75) Inventors: Naveed Iqbal, Hillsboro, OR (US); Mousumi M. Hazra, Beaverton, OR (US); Jiphun C. Satapathy, Portland, OR (US); Mojtaba Mirashrafi, Portland, OR (US); Walter Gintz, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 13/078,740

(22) Filed: Apr. 1, 2011

(65) Prior Publication Data

US 2012/0250858 A1 Oct. 4, 2012

(51) Int. Cl.
*H04L 29/06* (2006.01)
*H04L 9/08* (2006.01)
*G06F 9/48* (2006.01)
*H04L 29/08* (2006.01)

(52) U.S. Cl.
CPC ............ *H04L 9/0861* (2013.01); *G06F 9/4856* (2013.01); *H04L 67/148* (2013.01)

(58) Field of Classification Search
USPC ......................................................... 380/44
See application file for complete search history.

(56) References Cited

U.S. PATENT DOCUMENTS

| | | | | |
|---|---|---|---|---|
| 4,227,253 A | * | 10/1980 | Ehrsam et al. ................... | 380/45 |
| 7,277,947 B1 | * | 10/2007 | Van De Sluis et al. ....... | 709/227 |
| 8,090,836 B1 | * | 1/2012 | Bean et al. .................... | 709/227 |
| 2002/0129126 A1 | * | 9/2002 | Chu et al. ...................... | 709/220 |
| 2005/0075986 A1 | * | 4/2005 | You et al. ........................ | 705/71 |
| 2006/0005010 A1 | * | 1/2006 | Olsen et al. ................... | 713/156 |
| 2006/0161502 A1 | * | 7/2006 | Cerruti et al. ................... | 705/71 |

(Continued)

FOREIGN PATENT DOCUMENTS

| | | |
|---|---|---|
| JP | 2000331166 A | 11/2000 |
| JP | 2003233589 A | 8/2003 |

(Continued)

OTHER PUBLICATIONS

Akdemer et al., "Breakthrough AES Performance with Intel AES New Instructions", Version 1, Intel White Paper, Apr. 14, 2010, pp. 1-12.

(Continued)

*Primary Examiner* — Joseph P Hirl
*Assistant Examiner* — Chi Nguy
(74) *Attorney, Agent, or Firm* — Grossman, Tucker, Perreault & Pfleger, PLLC (57) ABSTRACT

A system for application usage continuum across client devices and platforms includes a first client device configured to execute a first instance of an application and a second client device configured to execute a second instance of the application. The first client device is configured to receive an indication to transfer operation of the first instance of the application running on the first client device to the second instance of the application on the second client device. The first client device is further configured to generate state information and data associated with execution of the first instance of the application on the first client device and cause the state information to be sent to the second client device to enable the second instance of the application on the second client device to continue operation of the application on the second client device using the state information from the first client device.

29 Claims, 6 Drawing Sheets

(56) References Cited

U.S. PATENT DOCUMENTS

| | | | |
|---|---|---|---|
| 2006/0179478 A1* | 8/2006 | Han et al. ........................... | 726/5 |
| 2007/0016638 A1 | 1/2007 | Elbury et al. | |
| 2007/0054627 A1* | 3/2007 | Wormald ........................ | 455/70 |
| 2007/0150742 A1* | 6/2007 | Cukier et al. ................. | 713/182 |
| 2007/0177737 A1* | 8/2007 | Jung et al. ..................... | 380/270 |
| 2007/0219917 A1 | 9/2007 | Lin et al. | |
| 2008/0056501 A1 | 3/2008 | McGough | |
| 2009/0097769 A1* | 4/2009 | Velasquez et al. ............ | 382/249 |
| 2009/0150453 A1* | 6/2009 | Sreekanth ..................... | 707/201 |
| 2009/0204966 A1 | 8/2009 | Johnson et al. | |
| 2009/0328145 A1* | 12/2009 | Berger et al. .................... | 726/3 |
| 2010/0255785 A1* | 10/2010 | Jung et al. ..................... | 455/41.2 |
| 2012/0222028 A1* | 8/2012 | Nakajima et al. ................. | 718/1 |
| 2012/0226866 A1* | 9/2012 | Bozek et al. ................. | 711/122 |

FOREIGN PATENT DOCUMENTS

| | | |
|---|---|---|
| JP | 2007249730 | 9/2007 |
| JP | 2007249730 A | 9/2007 |
| WO | 2010136866 | 12/2010 |
| WO | 2010136866 A1 | 12/2010 |

OTHER PUBLICATIONS

International Search Report and Written Opinion from related case PCT/US11/67353, mailed Sep. 25, 2012, 11 pages.

International Preliminary Report on Patentability received for Patent Application No. PCT/US2011/067353, mailed on Oct. 10, 2013.

Office action received for Papan patent application No. 2014-502551, mailed on Oct. 28, 2014.

Extended European Search Report received for EP Patent Application No. 11862291.9, mailed on Nov. 27, 2014.

Korean Office Action from related Application KR2013-7029002 mailed Feb. 23, 2015.

Office Action received for Japanese Patent Application No. 2014-502551, mailed Jul. 16, 2015, 2 pages English translation and 1 pages Japanese Office Action.

Office Action received for Chinese Patent Application No. 201180070543.5, mailed Jun. 3, 2015, 11 pages.

Office Action received for Taiwan Patent Application No. 100149542, mailed Sep. 21, 2015, 7 pages of English ranslation and 8 pages of Taiwan Office Action.

* cited by examiner

APPLICATION USAGE CONTINUUM ACROSS PLATFORMS

FIELD

The present disclosure relates to an application usage continuum, and, more particularly, to application usage continuum across platforms.

BACKGROUND

Personal computing include desktops, notebooks, netbooks, tablets, and/or smart devices. Current methods of sharing information, such as documents, and/or media content, between one or more devices may require a user to save the desired file from a first device on a temporary transport means (flash storage, email transfer, and/or IM file transfer, for example) and transfer the entire file to a destination device. In order to access the transferred file on the destination device, the user may be required to open the file in an appropriate application existing on the destination device and restore state of the transferred information manually from saved data using bookmarks or contextual information about the content of the file.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure provides systems (and methods) for application usage continuum across client platforms. One example system includes a first client device running a first instance of an application, and a second client device with a second instance of the application. A user (of the first device) decides to transfer operation of the application on the first client device to the second client device. In response to an indication by the user to transfer operation of the application, the first client device generates state information about the operational parameters of the running application and transfers the state information to the second client device. The second client device, in turn, launches the second instance of the application and proceeds with the application at the point where the user left off on the first device. Advantageously, this may enable the user to transfer a "live" application (e.g., video stream, audio stream, etc.) between two different devices, in real-time (or near real-time), without losing session data.

In some embodiments, the user may create one or more private domains and register devices and applications within each domain. Encryption mechanisms may be used so that only trusted devices within the domain are able to participate in the "live" transfer of application state information. In other embodiments, a server may be used in a "cloud" environment in which the server maintains the private domains and provisions encryption keys to provide security measures within the private domain and to prevent content from being shared outside the domain. The server and the client devices may coordinate to enable communication between the client devices using a variety of communication protocols.

Figure 1:
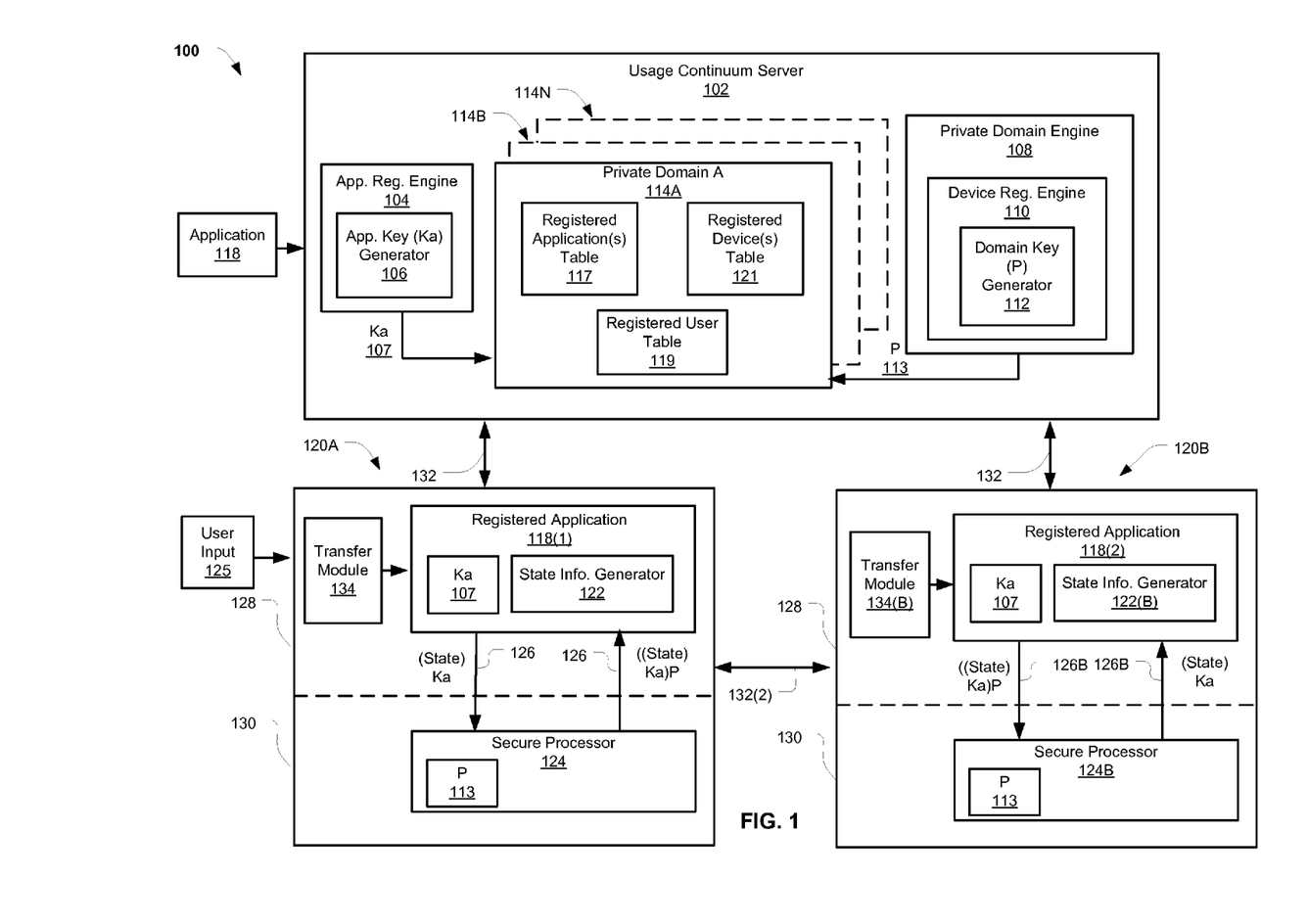
FIG. 1 illustrates an exemplary system embodiment consistent with the present disclosure.

FIG. 1 illustrates a system 100 consistent with various embodiments of the present disclosure. The system 100 may include a usage continuum server 102 (hereinafter "server 102"), and a plurality of client devices 120A, 120B. As a general overview of the system 100, each client device 120A and 120B is configured to communicate with one another to facilitate transfer of the operation of a running application from one device to another. The server 102 may be utilized to establish a private domain 114A that includes identifiers corresponding to the client devices 120A and 120B and at least one application 118 operable to run on the client devices 120A, 120B in the domain 114A. The server 102 may also provision encryption keys (e.g., Ka 107 and/or P 113) on a per-application and/or per-domain basis to enable secure transfer of state information between client devices 120A and 120B. Each of the components of FIG. 1 is described in greater detail herein.

The server 102 may include an application registration engine 104 and a private domain engine 108. The application registration engine 104 may be configured to register at least one application 118 with the server 102, and to determine if the application 118 is operable to run on the first and second client devices 120A, 120B. Client devices 120A-120B may independently include, but are not limited to, a mobile phone, smartphone, personal media player (PMP), personal digital assistant (PDA), netbook, notebook, desktop, and/or handheld electronic device. In addition, the application registration engine 104 may also include an application key generator 106. The key generator 106 is configured to generate an encryption key, hereinafter Ka 107, for each application 118 that is registered with the server 102. Ka 107 may include, for example, a public key, private key, or other known encryption key.

The private domain engine 108 may be configured to generate at least one private domain 114A on the server 102. In the illustrated embodiment, the private domain engine 108 may be configured to generate a plurality of private domains 114A, 114B, . . . , 114N on the server. For ease of description, an individual private domain that may be any of the plurality of private domains will be referred to herein as "private domain 114". The private domain engine 108 may include a device registration engine 110 configured to register at least one of the first and second client devices 120A, 120B with the server 102, and particularly with a specific private domain 114. In addition, the device registration engine 110 may also include a domain key generator 112. The domain key generator 112 is configured to generate a domain key P 113, for each private domain 114 generated in the server 102. Domain key P 113 may include, for example, a public key, private key, or other known encryption key.

In the illustrated embodiment, each private domain 114 may include a registered application table 117, a registered user table 119, and a registered device table 121. Registered application table 117 may include an identity of each application registered with the private domain 114 on the server 102. Registered user table 119 may include an identity of each user registered with the private domain 114 on the server 102. Registered device table 121 may include an identity of each client device 120A, 120B registered with the server 102 and included in that particular domain 114.

Upon generation of domain key P 113 for each private domain 114, the server 102 is configured to communicate with each client device 120A, 120B registered with the server 102 and identified in registered device table 121 via a communication link 132. Additionally, each client device (e.g., client device 120A) may communicate with another client device (e.g., client device 120B) via the communication link 132. The communication link 132 may include any wired and/or wireless means of communication, including, but not limited to, WiFi, WiMax, any one of the 802.1x standards, and/or Bluetooth communication. The server 102 is further configured to securely transfer domain key P 113 to each registered client device (e.g., client device 120A, 120B) and provision domain key P 113 in a secure processor 124 in each client device 120A, 120B. The secure processor 124 may include a processor having general purpose functions and/or security functions (i.e., safe keeping of key data and high-speed digital signature calculations).

In one embodiment, the server 102 may be configured to allow client devices 120A, 120B to be temporarily registered to a specific domain 114. The temporary registration of a client device 120A, 120B to a private domain 114 may enable a guest access mode. The temporary registration of client devices 120A, 120B may also allow time-limited temporary sharing of information between users of devices 120A, 120B initially registered on separate domains (e.g., 114A and 114N), thereby allowing an instantaneous collaborative network between users.

The server 102 may include any type of circuitry that is configured to exchange commands and data with each of the client devices 120A, 120B and/or the application 118. For example, the server 102 may include commodity circuitry (e.g., a multi-core CPU (which may include a plurality of processing cores and arithmetic logic units (ALUs)), memory, memory controller unit, video processor, network processor, network processor, bus controller, etc.) that is found in a general-purpose computing system (e.g., desktop PC, laptop, mobile PC, handheld mobile device, smart phone, etc.) and/or custom circuitry as may be found in a general-purpose computing system and/or a special-purpose computing system (e.g. highly reliable system, supercomputing system, etc.).

"Circuitry," as used in any embodiment herein, may comprise, for example, singly or in any combination, hardwired circuitry, programmable circuitry, state machine circuitry, and/or firmware that stores instructions executed by programmable circuitry.

The application 118 may include any type of software package, code module, firmware and/or instruction set that is configured to exchange commands and data with the server 102 and each client device 120A, 120B. For example, the application 118 may include a software package associated with a general-purpose computing system (e.g., end-user general purpose applications (e.g., Microsoft Word, Excel, etc.), network applications (e.g., web browser applications, email applications, etc.)) and/or custom software package, custom code module, custom firmware and/or custom instruction set (e.g., scientific computational package, database package, etc.) written for a general-purpose computing system and/or a special-purpose computing system.

For the purpose of this disclosure, the term "source device" refers to a first client device (e.g., client device 120A) from which the user desires to transfer a running application 118 and the term "target device" refers to a second client device (e.g., client device 120B) that the user desires to receive the running application 118. Thus, in the following discussion, source device may be used interchangeably with first client device 120A and target device may be used interchangeably with second client device 120B. Each client device 120A, 120B may include a host and/or open portion 128 and a secure portion 130. As may be appreciated, the host portion 128 may have limited access to the secure portion 130.

In one embodiment, a first instance of at least one application 118(1) may be running on a first client device 120A. Additionally, a second instance of the application 118(2) may be included on a second client device 120B. A user of the first client device 120A (source device) may wish to transfer state information and data from the running application 118(1) on the first client device 120A to a second client device 120B (target device) in a private domain 114. As used herein, state information means information indicative of a relative position within a sequence of ordered data of an application running on first client device 120A at the moment of transfer of the running application to another device. For example, state information may include operation parameter(s) of the application 118 representative of a time point within the application 118 when the user indicates a transfer function and which enables the application 118 to begin running on the target device 120B at the same, or approximately the same, relative position within the application 118.

By way of example, the user may be listening to an audio application on the first client device 120A. At any moment while the audio application is running, the user may selectively indicate a transfer of the running audio application to another client device (e.g., second client device 120B). At this moment of transfer indication, the state information of the audio application may include the relative position in the audio file (e.g., data corresponding to a timing counter or the like) at which the transfer indication occurred.

By way of another example, the user may be watching a video application on the first client device 120A. While the video file is running, the user may selectively indicate a transfer of the running video file to another client device (e.g., second client device 120B). The state information of the video file may include the relative position (e.g., data corresponding to a video frame or the like) at which the transfer indication occurred. Optionally, the state information may include the relative position of the corresponding audio (if any) to the video frame.

By way of yet a further example, the user may initiate a transfer of an office suite application running on the first client device 120A to another client device (e.g., second client device 120B). The office suite application may include, but is not limited to, a word processing application, a spread sheet application, a presentation application, and/or a drawing application. At the moment of the transfer indication, the state information of the office suite application may include data corresponding to the relative position (e.g., data corresponding to a page or sheet being viewed by the user) at the time which the transfer indication occurred.

The first and second instances of the application 118(1), 118(2) may be registered with the server 102 according to methods described herein. Upon registration of the first and second instances of the application 118(1), 118(2), the application specific key Ka 107 is generated (specific to registered applications 118(1)-118(2)). The user may further create a private domain 114A by registering the first and second client devices 120A, 120B with the server 102 as described herein. The registered application table 117 and registered device table 121 of the private domain 114A may be configured to contain identifiers corresponding to the registered applications 118(1), 118(2) and registered client devices 120A, 120B, respectively. Upon registration of each of the devices 120A, 120B, the server 102 is configured to securely provision domain key P 113 (specific to private domain 114A) in the secure processor 124 in each client device 120A, 120B registered.

Optionally, client devices 120A, 120B may include copies of the registered application table 117, the registered user table 119, and/or the registered device table 121 (not shown for clarity). For example, the client devices 120A, 120B may use the registered application table 117 to determine whether a particular application running on the client device is compatible with the transfer operation of the present disclosure. The client devices 120A, 120B may use the registered user table 119 to determine whether a particular user of the client device 120A, 120B is authorized to transfer a particular application and to which client devices the user may transfer the application. The client devices 120A, 120B may also use the registered device table 121 to determine and/or identify other client devices which the particular application running may be transferred. For example, the first client device 120A may utilize the registered device table 121 to determine a list of potential client devices in communication range of the first client device 120A, and present this list to the user for selection.

Upon registration of the applications 118(1)-118(2) and the client devices 120A-120B, the user may selectively indicate his desire to transfer operation of the first instance of the application 118(1) running on the source device 120A to the target device 120B via a user input 125. The user input 125 may include any means of selective input by a user, including, but not limited to, gesture recognition, motion recognition, and/or proximity aware technology, as well as other input means. While not an exhaustive list, the user input 125 may include a swiping motion across a portion of a display device (such as a touch screen or the like), a shaking motion, entering a password and/or pin number, activation of an icon and/or menu, or the like. Each client device 120A-120B may include a transfer module 134 configured to receive the user input 125 and communicate the indication with the first and second instances of the applications 118(1), 118(2).

The transfer module 134 may be configured to identify and/or verify the user input 125 as a user input 125 and/or present a list of potential target devices for the transfer. For example, the transfer module 134 may present a list of potential target devices for the transfer based, at least in part, on the registered user table 119, registered device table 121, and/or the identity of any devices in communication range of the source device 120A. According to one embodiment, transfer module 134 may graphically present a list of potential target devices based on the registered device table 121 using one or more types of icons or the like. The icons may represent different types of devices (such as, but not limited to, mobile phones, smartphones, personal media players (PMP), personal digital assistants (PDA), netbooks, notebooks, desktops, and/or handheld electronic devices). As may be appreciated, some potential target devices associated with registered device table 121 may be out of range due to the limitations of the communication link 132(2) used to communicate between devices (for example, if the communication link 132(2) is a near field communication, wireless ad-hoc networks, etc.). As such, the transfer module 134 may be configured to present (e.g., display) only the registered client devices which are in communication range. The transfer module 134 may optionally arrange the icons on a display based on their physical positions relative to the source device 120A. The user may then select the desired target device 120B, for example, using a gesturing motion or the like. The transfer module 134 may then transfer the indication to transfer operation as well as data representing the identity of the target device 120B to the first instance of the registered application 118(1).

The first instance of the registered application 118(1) may include a state information generator 122 configured to generate a state blob (State) upon receiving the indication to transfer operation. The term "blob" may refer to a collection of data stored as a single entity, which can include images, audio, and/or other multimedia objects. The first instance of the application 118(1) is configured to either encrypt and/or sign the state blob (State) using the application specific key Ka 107 forming an application-encrypted state blob (State) Ka. The key for signing may be derived from domain key P 113. The application-encrypted state blob (State)Ka includes state information, and optionally may include data of the first instance of the registered application 118(1) currently running on the source device 120A.

For example, in one embodiment, the first instance of the registered application 118(1) may include a video file running on the source device 120A. The user may be viewing the video at a particular mark or frame of the video file, such as "frame F," when indication to transfer operation is received. State information included in (State)Ka may include data representative of frame F (i.e., the frame at which the indication to transfer operation is received). The state information included in (State)Ka may also include data representative of the remaining frames (e.g., the frames ranging from frame F to the last frame of the video file). Alternatively, the state information may include the entire video file (all frames of the video file), as well as data indicating frame F, thereby allowing a user to view the entire video file on the target device 120B, or just continue from the frame at which the file was transferred (frame F). For example, the user and/or the application 118(1) may pause the video file (frame F) on the source device 120A, transfer the video file to the target device 120B, and resume watching the video on the target device 120B starting at frame F.

The first instance of the registered application 118(1) is further configured to communicate with the secure processor 124 of the first client device 120A via a secure communication link 126. The first instance of the registered application 118(1) is configured to transfer (State)Ka to the secure processor 124 of the source device 120A via the communication link 126. The first instance of the registered application 118 (1) is further configured to request the secure processor 124 to encrypt and/or sign (State)Ka with the domain key P 113. Upon receiving (State)Ka and the encryption request from the first instance of the registered application 118(1), the secure processor 124 is configured to encrypt and/or sign (State)Ka with a domain key P 113 forming a domain-encrypted state blob ((State)Ka)P (protected with domain key P 113).

Upon registration of the client devices 120A-120B in the private domain 114A, the first and second client devices 120A, 120B may be configured to communicate and transfer information, particularly state information of a registered application running on one of the devices, with one another via a communication link 132(2). In addition to examples of communication links 132 described herein, the communication link 132(2) may also include near field communication, wireless ad-hoc networks, etc. The client devices 120A-120B may also be configured to communicate with the server 102 to discover an identity, such as an IP address, of each registered client device, such as in a collaborative use scenario.

Upon discovery of client devices, the source device 120A is configured to establish a secure connection with the target device 120B via the communication link 132(2) in the private domain 114A. The source device 120A is further configured to transfer ((State)Ka)P to the target device 120B via the communication link 132. Upon receiving ((State)Ka)P, the target device 120B (for example, the transfer module 123(B)) is configured to initiate a launch of the second instance of the registered application 118(2). The user and/or second instance of the registered application 118(2) is configured to communicate with and transfer ((State)Ka)P to a secure processor 124B of the target device 120B via a secure communication link 126(B). The second instance of the registered application 118(2) is further configured to request the secure processor 124B to decrypt and/or verify ((State)Ka)P.

Upon receiving ((State)Ka)P and the decryption request from the second instance of the registered application 118(2), the secure processor 124B is configured to decrypt and/or verify ((State)Ka)P, using the domain key P 113, and generate (State)Ka. The secure processor 124B is further configured to transfer (State)Ka to the second instance of the registered application 118(2) via the secure communication link 126 (B). Upon receiving (State)Ka, the second instance of the registered application 118(2) is configured to decrypt and/or verify (State)Ka, using the application specific key Ka 107, and generate and restore state information of the first instance of the registered application 118(1) transferred in ((State)Ka)P. The second instance of the registered application 118(2) is configured to resume execution of the application 118 on the target device 120B with the generated and restored state information. It should be noted that the foregoing discussion can alternatively apply in other embodiments, for example, where the second client device 120B may be the source device and the first client device 120A may be the target device.

Figure 2:
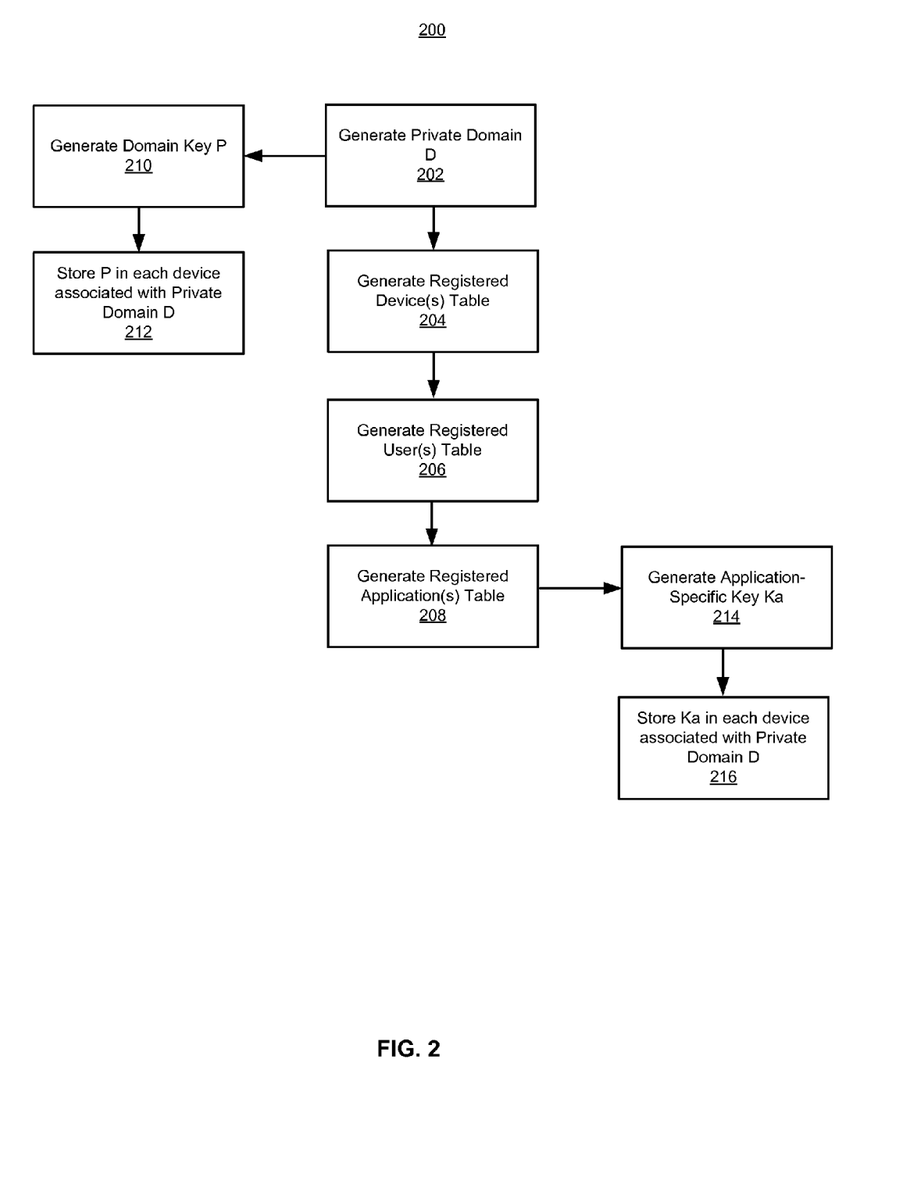
FIG. 2 illustrates a flowchart of operations for establishing a private domain according to one embodiment of the present disclosure.

FIG. 2 illustrates a flowchart 200 of operations to establish a private domain according to one embodiment of the present disclosure. For example, the method 200 may include creating a new private domain D (operation 202); generating a registered device table including identifiers corresponding to one or more devices associated with private domain D (operation 204); generating a registered user table including identifiers corresponding to one or more users associated with private domain D (operation 206); and generating a registered application table including identifiers corresponding to one or more applications associated with private domain D (operation 208).

According to one embodiment, private domain D may be created (operation 202) by the server, for example, by the private domain engine of the server, upon initiation by a user. Upon creating private domain D, a Domain Key P may be generated (operation 210). The domain key P may be generated by the server, for example, the domain key generator of the server, and may include a public key, private key, or other known encryption key. The domain key generator may generate the domain key P using any encryption methodology such as, but limited to, Intel® Advanced Encryption Standard (AES), available from the assignees of the present disclosure. The domain key P may be stored in each device associated with private domain D (operation 212). For example, the domain key P may be stored in the secure processor of each device associated with private domain D.

The registered device table may be generated (operation 204) by the user through the server. For example, one or more users may register device(s) with private domain D using the device registration engine of the server to generate the registered device table. The registered device table may include a plurality of identifiers which each correspond to one of the devices associated with private domain D.

Similarly, one or more users may register with private domain D to generate the registered device table (operation 206). The registered user table may include a plurality of identifiers which each correspond to one of the users associated with private domain D. The registered user table may optionally include an identifier which corresponds to particular device(s) that the user is associated.

One or more applications may be registered with the server to generate the registered application table (operation 208). The application(s) may be registered by a user, the manufacturer, and/or a third party. For example, the applications may be registered with the server using the application registration engine. Once the application is registered, the server generates an application-specific key Ka (operation 214), for example, using the application key generator. The application-specific key Ka may include, for example, a public key, private key, or other known encryption key, and may be generated using any encryption methodology such as, but not limited to, Intel® Advanced Encryption Standard (AES), available from the assignees of the present disclosure. The application-specific key Ka may then be stored in each device associated with private domain D (operation 216). For example, the application-specific key Ka may be stored in the registered application 118 on each client device.

According to another embodiment, the method 200 of the present disclosure may eliminate the server. In particular, one or more client devices may include a private domain engine, device registration engine, and/or an application registration engine as described herein. A user may generate private domain D (operation 202) and generate a domain key P using the private domain engine of a first client device, which may then be transferred to the other devices associated with private domain D (operation 212).

Similarly, one or more client devices may be configured to generate a registered device table (operation 204). For example, a first client device may act as a hub for registering devices and generating the registered device table, which may then be transferred to the other devices associated with private domain D. Alternatively, each client device may be configured to independently register and/or generate a registered device table (which may be communicated to the other devices on the registered device table, for example, in round-robin or the like).

The registered application table may be generated (operation 208) using an application registration engine of one or more of the client devices associated with private domain D, and an application-specific key Ka may be generated (operation 214) using an application key generator of one or more of the client devices associated with private domain D. For example, a first client device may act as a hub for registering application and generating the registered application table, which may then transferred to the other devices on the registered device table (operation 216). The registered user table may be generated (operation 206) in a similar manner as the other tables.

Figure 3:
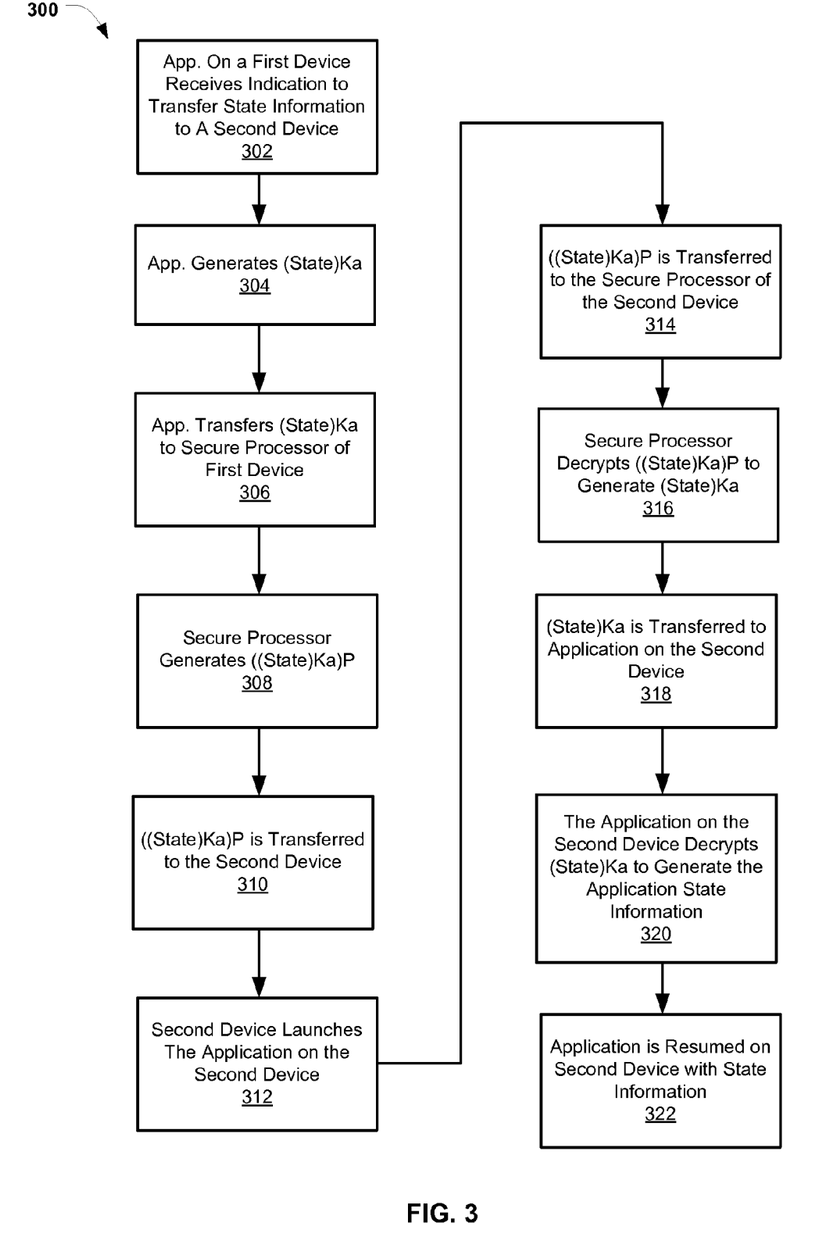
FIG. 3 illustrates a flowchart of operations of the application usage continuum across platforms according to one embodiment of the present disclosure.

FIG. 3 illustrates a flowchart 300 of operations of the application usage continuum across platforms for transferring an application running on a first device to a second device according to one embodiment of the present disclosure. An indication to transfer state information of an application, running on a first device, to a second device may be received at the first device (operation 302). An application key-encrypted state blob (State)Ka may be generated by the first device (operation 304). The (State)Ka may be transferred from the first application to a secure processor of the first device (operation 306) and the secure processor may generate a domain key-encrypted state blob ((State)Ka)P (operation 308). The ((State)Ka)P may be transferred to the second device (operation 310) and a second instance of the application may be launched on the second device (operation 312). The ((State)Ka)P may be transferred to a secure processor of the second device (operation 314) which may decrypt and/or verify ((State)Ka)P to generate (State)Ka (operation 316). (State)Ka may then be transferred to the second instance of the application on the second device (operation 318) which may decrypt and/or verify (State)Ka to generate the state information for the second instance of the application (operation 320). The second instance of the application may then resume on the second device with the state information (operation 322), for example, at the point in time when the transfer function was initiated on the first device.

Figure 4:
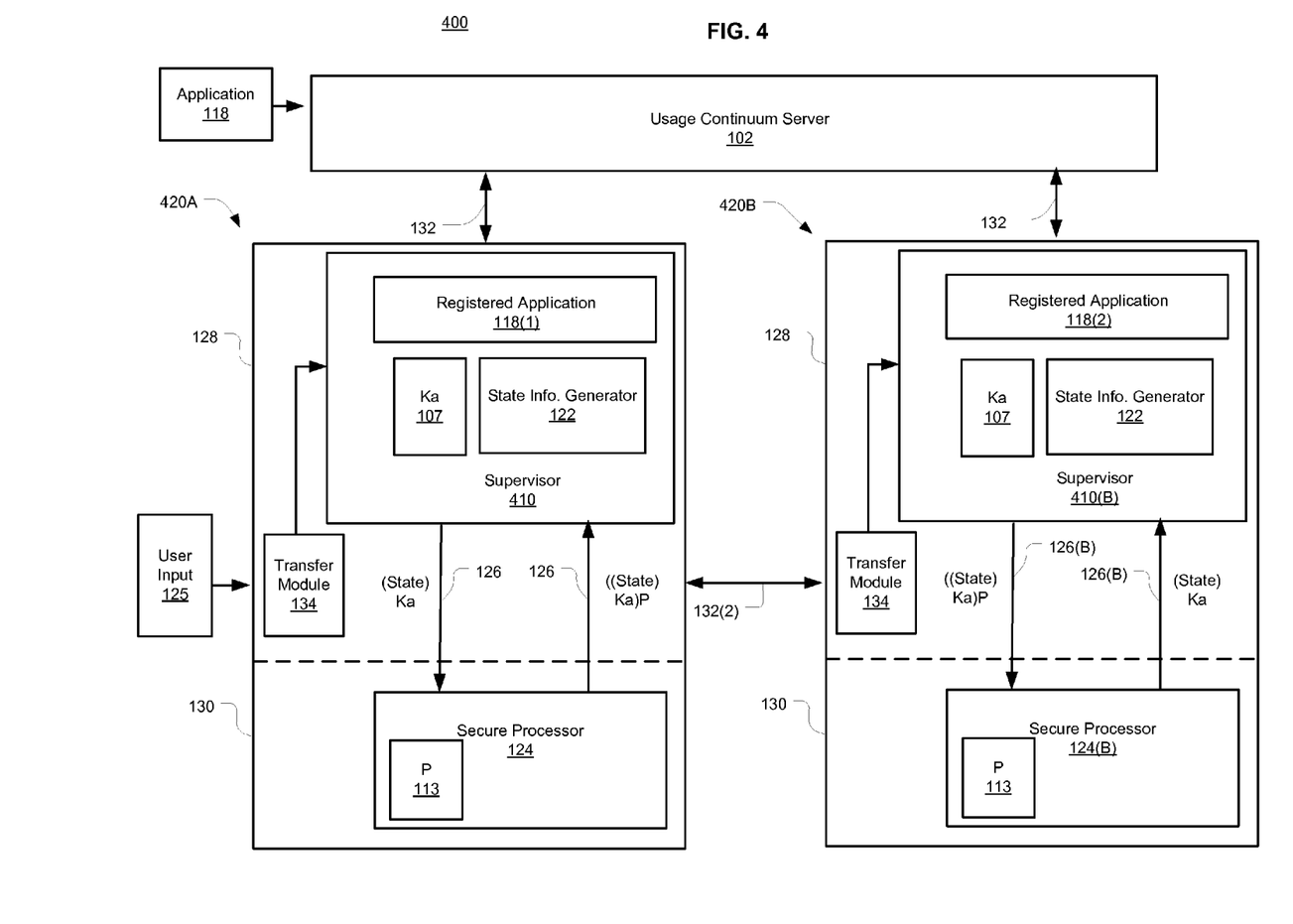
FIG. 4 illustrates another exemplary system embodiment consistent with the present disclosure.

Turning now to FIG. 4, another embodiment of a system 400 consistent with various embodiments of the present disclosure is generally illustrated. The system 400 is similar to system 100 of FIG. 1, except that the client devices 420A, 420B include a hypervisor and/or supervisor 410 and the applications 118 are independent of the transfer operations. In particular, the supervisor 410 includes a state information generator configured to generate state information related to the first instance of application 118(1) upon receipt of an indication from transfer module 134 that a user wants to transfer the application 118 to another device. The supervisor 410 is further configured to generate a state blob (State) upon receiving the indication to transfer operation and to encrypt and/or sign the state blob (State) using the application specific key Ka 107 forming an application-encrypted state blob (State)Ka. The application-encrypted state blob (State)Ka includes state information and, optionally data of the first instance of the registered application 118(1) currently running on the source device 420A.

The supervisor 410 is further configured to transfer (State)Ka to the secure processor 124 of the source device 120A via the communication link 126 and request the secure processor 124 to encrypt and/or sign (State)Ka with the domain key P 113. Upon receiving (State)Ka and the encryption request from the supervisor 410, the secure processor 124 is configured to encrypt and/or sign (State)Ka with a domain key P 113 forming a domain-encrypted state blob ((State)Ka)P (protected with domain key P 113).

The domain-encrypted state blob ((State)Ka)P may be received by the second client device 420B (e.g., via a communication link 132(2)) and the second instance of the registered application 118(2) is launched. The supervisor 410(B) is configured to communicate with and transfer ((State)Ka)P to a secure processor 124B of the target device 420B via a secure communication link 126(B) and request the secure processor 124B to decrypt and/or verify ((State)Ka)P.

Upon receiving ((State)Ka)P and the decryption request from the second instance of the registered application 118(2), the secure processor 124B is configured to decrypt and/or verify ((State)Ka)P, using the domain key P 113, and generate (State)Ka. The secure processor 124B is further configured to transfer (State)Ka to the supervisor 410(B) via the secure communication link 126(B). Upon receiving (State)Ka, the supervisor 410(B) is configured to decrypt and/or verify (State)Ka, using the application specific key Ka 107, and generate and restore state information of the first instance of the registered application 118(1) transferred in ((State)Ka)P. The second instance of the registered application 118(2) is configured to resume execution of the application 118 on the target device 420B with the generated and restored state information.

Figure 5:
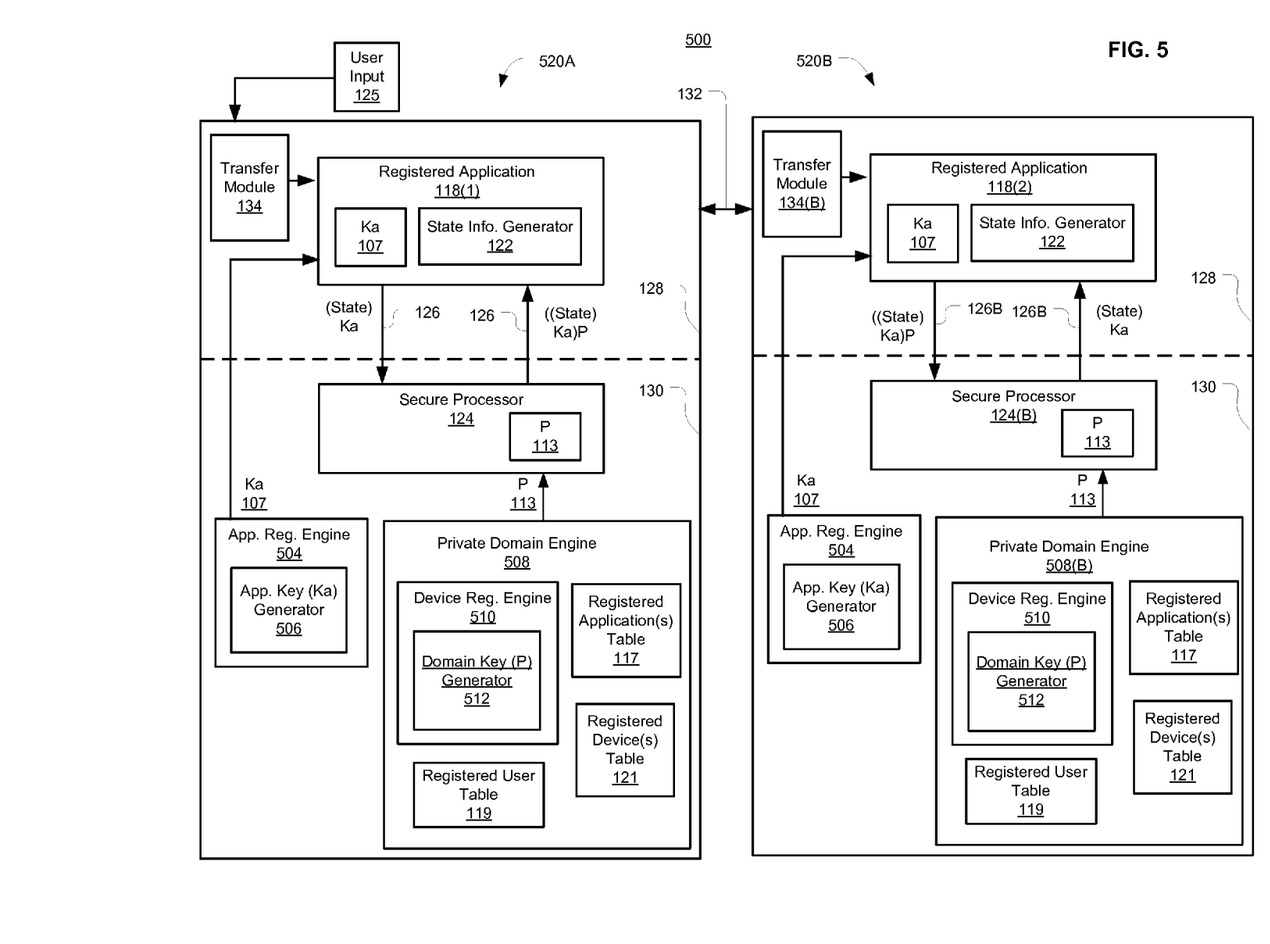
FIG. 5 illustrates yet another exemplary system embodiment consistent with the present disclosure.

Turning now to FIG. 5, yet another embodiment of a system 500 consistent with various embodiments of the present disclosure is generally illustrated. The system 500 comprises one or more devices 520A, 520B to create a private domain and/or transfer an application 118 running on a first client device 520A (hereinafter "source device 520A") to a second client device 520B (hereinafter "target device 520B). The system 500 may therefore eliminate the usage continuum server 102 of system 100 (FIG. 1). As a general overview of the system 500, each client device 520A and 520B is configured to communicate with one another to facilitate transfer of the operation of a running application from one device to another. Aspects of system 500 which are the same as system 100 (FIG. 1) will not be repeated for the sake of brevity.

While one or more of the devices 520A, 520B of system 500 may be similar to the devices 120A, 120B of system 100, at least one of the devices 520A, 520B is configured to create a new private domain D; generate a registered device table including identifiers corresponding to one or more devices associated with private domain D; generate a registered user table including identifiers corresponding to one or more users associated with private domain D; and generate a registered application table including identifiers corresponding to one or more applications associated with private domain D as described herein. For the sake of clarity, the first device 520A will be described; however, it will be appreciated that any client device in system 500 may be configured to perform the following operations.

The first client device 520A may also include a private domain engine 508 configured to generate one or more private domains (for example, private domain D), and a device registration engine 510 configured to allow a user to register one or more client devices to be associated with private domain D and generate registered device table 121 (which transmitted one or more of the other devices associated with private domain D). A domain key (P) generator 512 may create a domain key P, which may be transmitted to one or more of the other devices associated with private domain D based on the registered device table 121. Additionally, a registered user table 119 may be generated on the client device 520A which links a user to one or more applications and/or devices in the private domain.

An application 118 to be associated with private domain D may be registered using an application registration engine 504 of first device 520A. Once the application 118 is registered, an application key generator 506 may generate an application-specific key Ka. A registered application table 117 may be generated and the application-specific key Ka may be stored with the Application 118(1). The first device 520A may also be configured to transmit the application-specific key Ka to one or more of the other devices associated with private domain D.

A user may initiate a transfer operation, which may proceed substantially as described herein. Because the client device(s) 520A, 520B are configured to create the private domain(s), register the application(s), and generate the keys Ka, P, the system 500 may eliminate the need for the server of FIG. 1. Again, not all client devices associated with the system 500 need to be able to perform these functions, instead, one client device may function as a hub device for the other devices which may function substantially the same as in FIG.

1, with the exception that the keys Ka, P may be generated by and received from the hub device (e.g., client device 520A).

Figure 6:
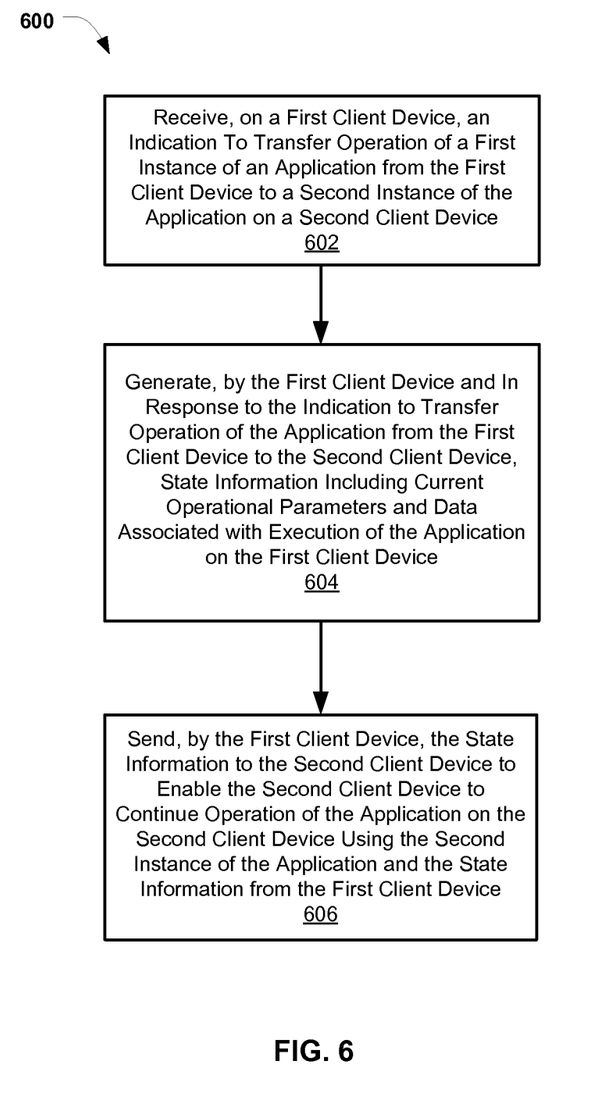
FIG. 6 illustrates a flowchart of operations according to one embodiment of the present disclosure.

FIG. 6 illustrates a flowchart 600 of operations according to one embodiment of the present disclosure. Operations of this embodiment may include receiving, on a first client device, an indication to transfer operation of a first instance of an application from the first client device to a second instance of the application on a second client device (operation 602). Operations may also include generating, by the first client device and in response to the indication to transfer operation of the application from the first client device to the second client device, state information including current operational parameters and data associated with execution of the application on the first client device (operation 604). Operations may further include sending, by the first client device, the state information to the second client device to enable the second client device to continue operation of the application on the second client device using the second instance of the application and the state information from the first client device (operation 606).

While various systems and methods have been described, it is to be understood that various features in any embodiment may be combined with other embodiments. For example, the hypervisor of FIG. 4 may be combined with FIGS. 1 and/or 5. Alternatively (or in addition), the systems of FIG. 1 or 4 may be modified to eliminate the server as described in FIG. 5. Indeed, it is fully contemplated herein that in other embodiments of the present disclosure, the operations depicted in FIGS. 2, 3, and/or 6, may be combined in a manner not specifically shown in any of the drawings, but still fully consistent with the present disclosure. Thus, claims directed to features and/or operations that are not exactly shown in one drawing are deemed within the scope and content of the present disclosure.

The system and/or methods of the present disclosure are configured to enable a secure, dynamic, and seamless porting of an executing application across trusted devices in real-time, preserving state information and data. In addition, a secure communication infrastructure may be established for facilitating a trusted transfer of application state information and data transfer.

In other embodiments, the system and/or methods of the present disclosure may include additional usage schemes. The user can create different usage schemes to accommodate different usages. For example, a Morning Commute (MC) scheme can include an Airport Morning Commute (AMC) scheme, a Work Morning Commute (WMC) scheme, and/or a Travel Morning Commute (TMC) scheme. Each scheme may include a collection of trusted applications related to a particular usage.

For example, the AMC scheme may include weather, traffic, radio content, media content, phone, airline information, and/or work-related applications. In one embodiment, the AMC scheme can be aggregated in the user's home system. Prior to leaving the house, the user can transfer (e.g. by using gesture and/or motion technology, voice command, and/or one-touch preprogrammed buttons) the state information of the AMC trusted applications to other IA devices (e.g. smart phone, vehicle infotainment system, PC, etc.) in the user's trusted domain. When the user enters his vehicle to drive to the airport, the vehicle's infotainment center, including the GPS system, for example, will have route and traffic information to the airport already showing.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing platform, device or system, computing platform, device or system and may be implemented using any suitable combination of hardware and/or software. The instructions may include any suitable type of code and may be implemented using any suitable programming language.

Thus, in one embodiment the present disclosure provides a system for providing an application usage continuum across client devices. The system includes a first client device configured to execute a first instance of an application and a second client device configured to execute a second instance of the application. The first device is further configured to receive an indication to transfer operation of the first instance of the application running on the first client device to the second instance of the application on the second client device and to generate state information and data associated with execution of the first instance of the application on the first client device. The first client device is further configured to cause the state information to be sent to the second client device to enable the second instance of the application on the second client device to continue operation of the application on the second client device using the state information from the first client device.

In another embodiment, the present disclosure provides a method for an application usage continuum between a first client device having a first instance of the application and a second client device having a second instance of the application. The method includes receiving, on the first client device, an indication to transfer operation of the first instance of the application running on the first client device to the second instance of the application on the second client device; generating, by the first client device and in response to the indication to transfer operation of the first instance of the application, state information and data associated with execution of the first instance of the application on the first client device; and sending, by the first client device, the state information and data to the second client device to enable the second instance of the application on the second client device to continue operation of the application on the second client device using the second instance of the application and the state information from the first client device.

In another embodiment, the present disclosure provides a tangible computer-readable medium including instructions stored thereon which, when executed by one or more processors, cause the computer system to perform operations that include generating, by a first client device and in response to an indication to transfer operation of a first instance of an application on the first client device, state information and data associated with execution of the first instance of the application on the first client device; and sending, by the first client device, the state information to the second client device to enable the second instance of the application on the second client device to continue operation of the application on the second client device using the state information from the first client device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for providing an application usage continuum across client devices, said system comprising:
    a first client device, configured to present a list of potential target devices and configured to execute a first instance of an application;
    and wherein, said first client device is further configured to:
        receive an indication to transfer operation of said first instance of said application running on said first client device to a second instance of said application on a second client device from among the list of target devices;
        generate state information and data associated with execution of said first instance of said application on said first client device, wherein said state information includes information indicative of a relative position within a sequence of ordered data of said first instance of said application executing on said first client device;
        encrypt or sign a state blob using an application key Ka to form an application-encrypted state blob (State)Ka, said (State)Ka comprising state information of said first instance of said application protected with said application key Ka;
        encrypt or sign said (State)Ka using said a secure processor of said first client device and a domain encryption key P to form a domain-encrypted state blob ((State)Ka)P; and
        cause said ((State)Ka)P to be sent to said second client device to enable said second instance of said application on said second client device to continue operation of said application on said second client device using said state information from said first client device.

2. The system of claim 1 further comprising a server configured to generate a private domain comprising an identity of each of said first and second client devices and an identity of said application.

3. The system of claim 2, wherein said server is configured to generate application encryption keys Ka for each of said first and second instances of said application and domain encryption keys P for said private domain and storing said domain encryption keys P on each of said first and said second client devices.

4. The system of claim 1, wherein said second client device is configured to decrypt or verify said (State)Ka and restore said state information on said second client device.

5. The system of claim 1, wherein said second device comprises a secured processor configured to decrypt said ((State)Ka)P using said second client device to form said (State)Ka.

6. The system of claim 1, wherein said state information comprises data corresponding to a timing counter, a video frame, or a page number.

7. The system of claim 1, wherein said indication to transfer operation of said first instance of said application comprises a user input.

8. The system of claim 7, wherein said user input is selected from a group consisting of gesture recognition, motion recognition, voice recognition and command, and proximity aware technologies.

9. The system of claim 1, wherein said first client device is further configured to determine the list of potential target devices by identifying devices within communication range of said first client device.

10. The system of claim 9, wherein said first client device is further configured to arrange the list of potential target devices based on the physical position of the target device with respect to the said first client device.

11. The system of claim 1, wherein said first client device is further configured to graphically present the list of potential target devices using one or more icons.

12. The system of claim 11, wherein said icons represent one or more potential target devices selected from the group of a mobile phone, smart phone, personal media player, personal digital assistant, notebook computer, netbook, and handheld electronic device.

13. A method for an application usage continuum across client devices said method comprising:
    receiving, at a first client device configured to present a list of potential target devices and having a first instance of an application, an indication to transfer operation of said first instance of said application running on said first client device to a second instance of said application on a second client device from among the list of target devices;
    generating, by said first client device and in response to said indication to transfer operation of said first instance of said application, state information and data associated with execution of said first instance of said application on said first client device, wherein said state information includes information indicative of a relative position within a sequence of ordered data of said first instance of said application executing on said first client device;
    encrypting or signing, by said first client device, a state blob using an application key Ka to form an application-encrypted state blob (State)Ka, said (State)Ka comprising state information of said first instance of said application protected with said application key Ka;
    encrypting or signing said (State)Ka using said first client device and a domain encryption key P to form a domain-encrypted state blob ((State)Ka)P; and
    sending, by said first client device, said ((State)Ka)P and data to said second client device to enable said second instance of said application on said second client device to continue operation of said application on said second client device using said second instance of said application and said state information from said first client device.

14. The method of claim 13 further comprising generating a private domain using a server, said private domain comprising an identity of each of said first and second client devices and an identity of said application.

15. The method of claim 14 further comprising:
generating application encryption keys Ka for each of said first and second instances of said application; and
generating domain encryption keys P for said private domain and storing said domain encryption keys P on each of said first and said second client devices.

16. The method of claim 13, further comprising:
decrypting said ((State)Ka)P using said second client device to form said (State)Ka; and
decrypting said (State)Ka using said second client device;
wherein said second instance of said application is configured to restore said state information on said second client device.

17. The method of claim 13, wherein said state information comprises data corresponding to a timing counter, a video frame, or a page number.

18. The method of claim 13, wherein said indication to transfer operation of said first instance of said application comprises a user input.

19. The method of claim 18, wherein said user input is selected from a group consisting of gesture recognition, motion recognition, voice recognition and command, and proximity aware technologies.

20. The method of claim 13, further comprising:
determining, by said first client device, the list of potential target devices by identifying devices within communication range of said first client device.

21. The method of claim 20, further comprising:
arranging, by said first client device, the list of potential target devices based on the physical position of the target device with respect to the said first client device.

22. The method of claim 13, further comprising:
graphically presenting, by said first client device, the list of potential target devices using one or more icons.

23. The method of claim 22, wherein said icons represent one or more potential target devices selected from the group of a mobile phone, smart phone, personal media player, personal digital assistant, notebook computer, netbook, and handheld electronic device.

24. One or more non-transitory computer-readable mediums including instructions stored thereon which, when executed by one or more processors, cause the one or more processors to perform operations comprising:
generating, by a first client device configured to present a list of potential target devices and having a first instance of an application, in response to the indication to transfer operation of the first instance of the application, state information and data associated with execution of the first instance of the application on the first client device, wherein said state information includes information indicative of a relative position within a sequence of ordered data of said first instance of said application executing on said first client device;
encrypting or signing, by said first client device, a state blob using an application key Ka to form an application-encrypted state blob (State)Ka, said (State)Ka comprising state information of said first instance of said application protected with said application key Ka;
encrypting or signing said (State)Ka using said first client device and a domain encryption key P to form a domain-encrypted state blob ((State)Ka)P; and
causing the first client device to send the ((State)Ka)P to a second client device to enable the second instance of the application on the second client device to continue operation of the application on the second client device using the state information from the first client device.

25. The non-transitory computer-readable medium of claim 24 further comprising:
receiving, on said first client device, an indication to transfer operation of said first instance of said application running on said first client device to said second instance of said application on said second client device.

26. The non-transitory computer readable medium of claim 24, further comprising;
determining, by said first client device, said list of potential target devices by identifying devices within communication range of said first client device.

27. The non-transitory computer readable medium of claim 26, further comprising;
arranging, by said first client device, said list of potential target devices based on the physical position of the target device with respect to the said first client device.

28. The non-transitory computer readable medium of claim 24, further comprising;
graphically presenting, by said first client device, said list of potential target devices using one or more icons.

29. The non-transitory computer readable medium of claim 28, wherein said icons represent one or more potential target devices selected from the group of a mobile phone, smart phone, personal media player, personal digital assistant, notebook computer, netbook, and handheld electronic device.

* * * * *